United States Patent
Arai

(10) Patent No.: US 6,373,798 B1
(45) Date of Patent: Apr. 16, 2002

(54) RECORDING DEVICE WHICH CAN CONTINUOUSLY RECORD INFORMATION DATA ONTO PLURALITY OF INFORMATION MEDIA

(75) Inventor: Shinichi Arai, Shirakawa (JP)

(73) Assignee: Nippon Columbia Co., Ltd, Toyko (JP)

( * ) Notice: Subject to any disclaimer, the term of this patent is extended or adjusted under 35 U.S.C. 154(b) by 0 days.

(21) Appl. No.: 09/321,586

(22) Filed: May 28, 1999

(30) Foreign Application Priority Data

Jun. 2, 1998 (JP) .......................... 10-169248

(51) Int. Cl.[7] .............................. G11B 7/00
(52) U.S. Cl. .................. 369/47.23; 369/47.28; 369/59.26; 369/30.2
(58) Field of Search ................ 369/32, 47.23, 369/47.28, 59.26–59.27, 124.08–124.09, 30.2, 30.23

(56) References Cited

U.S. PATENT DOCUMENTS

| 5,263,010 A | * | 11/1993 | Amemiya et al. |
| 5,327,412 A | * | 7/1994 | Lee |
| 5,654,944 A | * | 8/1997 | Lee et al. |
| 5,731,923 A | | 3/1998 | Sakuma |
| 5,781,890 A | * | 7/1998 | Nematbakhsh et al. |

FOREIGN PATENT DOCUMENTS

| DE | 30 39 353 A1 | 5/1982 |
| EP | 0 364 998 A2 | 4/1990 |
| JP | 5-114196 | 5/1993 |
| JP | 8-315549 | 11/1996 |
| JP | 9-102185 | 4/1997 |

OTHER PUBLICATIONS

Patent Abstract of Japan; Publication No. 08315549; Publication Date Nov. 29, 1996; Inventor: Honda Kazuyuki.

* cited by examiner

Primary Examiner—W. R. Young
(74) Attorney, Agent, or Firm—Dickstein Shapiro Morin & Oshinsky LLP

(57) ABSTRACT

A recording device that can continuously record information data onto a plurality of information media without recording any particular information pertaining to continuous recording and without losing any information data is disclosed. The device records identical information overlapping onto two separate media for a predetermined time period.

8 Claims, 11 Drawing Sheets

RECORDING DEVICE WHICH CAN CONTINUOUSLY RECORD INFORMATION DATA ONTO PLURALITY OF INFORMATION MEDIA

BACKGROUND OF THE INVENTION

1. Field of the Invention

This invention relates to a recording device for information media which records information data and management data on information media having an information data area for recording information data and a management data area for recording management data.

2. Related Background Art

Conventionally, a recording device using a plurality of information media and continuously recording information data on said plurality of information media has been known. Such a recording device may be used e.g., to record long-time conference talks, sales talks or telephone talks on information media to retain it for evidence. The recording device reproduces the information recorded on media if necessary to disclose the recorded content.

For example, in Japanese Non-examined Patent Publication No. 9-102185 (and corresponding U.S. Pat. No. 5,731,923), there is disclosed such a recording device that continuously records information data on a plurality of information media. The carrier recording device described in Japanese Non-examined Patent Publication No. 9-102185 records information data continuously on plurality of carriers and index information, on a each carrier, indicating that the information data has been recorded continuously on two carriers.

Further, the carrier recording device continuously records information data by recording information data that is entered while control is transferred from one carrier to another carrier and recording the stored information data on the selected carrier after the new carrier is selected.

However, said carrier recording device is forced to record particular index information onto carriers. The end of information data recorded onto a carrier is continuous to the beginning of information data recorded onto the succeeding carrier and identical information data have never been recorded on a plurality of carriers.

Further, a reproducing device that continuously reproduces information data from a plurality of information media is disclosed, for example, in Japanese Non-examined Patent Publication No. 5-114196. The video signal reproducing device described in Japanese Non-examined Patent Publication No. 5-114196 is equipped with an overall command circuit to control reproduction of two VTR decks.

Immediately when the overall command circuit detects a Near End-of-Tape signal during reproduction of magnetic tape on one VTR deck, the overall command circuit controls the other VTR deck to reproduce magnetic tape which has stopped at a position where a Near Beginning-of-Tape has been recorded, and switches to the output of the other VTR deck immediately when the End-of-Tape signal from the former VTR deck is detected.

However, said video signal reproducing device also had to record particular signals such as Near End-of-Tape, End-of-Tape, Near Beginning-of-Tape, and Beginning-of-Tape signals on magnetic tapes. On said video signal reproducing device, the end of information data recorded onto one magnetic tape is continuous to the beginning of information data recorded onto the succeeding magnetic tape and an identical video signal has never been recorded on a plurality of magnetic tapes.

As described above, the conventional carrier recording device and the video signal reproducing device require recording of particular data which link information data recorded on two information media when information data is recorded continuously on plurality of information media. Information media recording particular data on it must be reproduced singly by a particular reproducing device that can reproduce such particular data. Therefore, a recording device has been required to record information data on plurality of information media without recording particular data.

When one recording device has completed recording information media, the recording device outputs a control signal to the other recording device to keep on recording succeeding data. In response to this control signal, the other recording device starts to record the succeeding data on the other recording media. In this case, due to a delay time period between the output of the control signal from one recording device and the start of continuous recording by the other recording device, part of information data in this delay time period may have been lost.

If information data is lost, no one can tell what data follows the end of information data recorded on one piece of information media and what data exists before the beginning of information data on the other piece of information media. Further, no one can tell even whether or not data is lost. Therefore, there currently exists a need for an apparatus that eliminates the above described loss of data.

SUMMARY OF THE INVENTION

An object of this invention is to provide a recording device for information media that can continuously record information data onto plurality of information media without recording any particular information pertaining to continuous recording and without losing any part of information data.

To accomplish said objects, a recording device for information media according to claim 1 is characterized in that the recording device for information media which records information data and management data on information media having an information data area for recording information data and a management data area for recording management data comprises a recording and reproducing means for recording information data or management data onto information media and reproducing information data or management data from information media, an overlap recording time setting means for setting an overlap recording time period, and a control and calculate means for calculating a single recording time period from a recordable time period obtained from the management data of said information media and the recording time period which is set by said recording time setting means, outputting a signal for starting continuous recording when a time period lapsed after the start of recording of information data onto said information media is equal to the single recording time period, and controlling said recording and reproducing means to stop recording the information on said information media when the time period lapsed from the output of the signal for starting continuous recording is equal to said overlap recording time period.

DETAILED DESCRIPTION OF PREFERRED EMBODIMENTS

Figure 1:
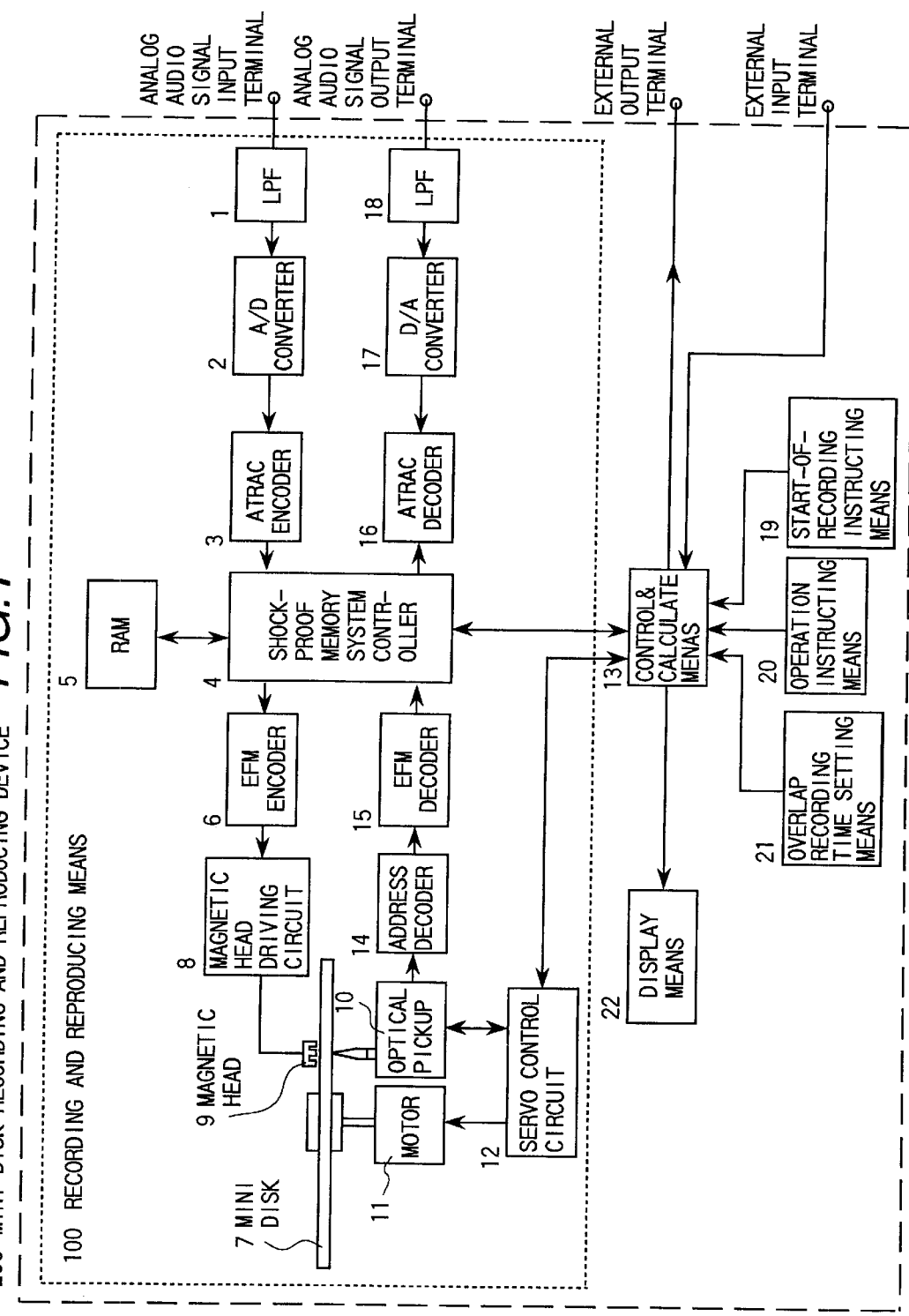
FIG. 1 is a block diagram illustrating a mini-disk recording and reproducing device which is a first embodiment of the present invention.

FIG. 1 is a block diagram of a mini-disk recording and reproducing device 200 which is a first embodiment of the present invention. Below is explained the recording system of said mini-disk recording and reproducing device 200. To receive an analog audio signal and convert it into EFM (Eight to Fourteen Modulation) data, said mini-disk recording and reproducing device 200 has a low-pass filter (LPF) 1, an analog-to-digital converter (A/D converter) 2, an ATRAC (Adaptive Transform Acoustic Coding) encoder 3, a shockproof memory system controller 4, RAM (Random Access Memory) 5, and an EFM encoder 6.

To record EFM data onto a mini disk 7, said mini-disk recording and reproducing device 200 has a magnetic head driving circuit 8, a magnetic head 9, an optical pickup 10, a motor 11, and a servo control circuit 12. The control and calculate means 13 controls each of said components to record EFM data onto a mini disk 7. The recording system of said mini-disk recording and reproducing device is built up as described above.

Referring now to the reproducing system of said mini-disk recording and reproducing device 200 which is the first embodiment of this invention, said mini-disk recording and reproducing device 200 has the optical pickup 10, the motor 11, and an address decoder 14 to reproduce EFM data from the mini disk 7.

Further to convert the EFM data into an analog audio signal, said mini-disk recording and reproducing device 200 has an EFM decoder 15, the shockproof memory system controller 4, RAM 5, an ATRAC encoder 16, a digital-to-analog converter (D/A converter) 17, and a LPF 18.

The control and calculate means 13 controls each of said components to reproduce analog audio signals. The reproducing system is built up as described above. Said recording system and said reproducing system are explained as a recording and reproducing means 100.

To the control and calculate means 13 are connected a start of recording instructing means 19 that instructs to start recording an analog signal that is entered to said mini-disk recording and reproducing device 200, an operation instructing means 20 equipped with push-button switches consisting of a reproducing instructing means, a stop instructing means, a track forward-search instructing means, a track reverse-search instructing means, and a pause instructing means, a overlap recording time period setting means 21 which sets a overlap recording time period and a display means 22 which displays various kinds of information.

Further, said mini-disk recording and reproducing device is equipped with an external output terminal that outputs a signal for starting continuous recording and a timing signal for stopping overlap recording to the outside and an external input terminal that receives a signal for starting continuous recording and a timing signal for stopping overlap recording from the outside and sends the signals to the control and calculate means 13.

Details of these signal for starting continuous recording and timing signal for stopping overlap recording signals will be explained later. The above description is for the first embodiment of said mini-disk recording and reproducing device 200.

Referring, next, to the control of the recording system of the mini-disk recording and reproducing device 200, the control and calculate means 13 outputs a control signal to the servo control circuit 12 to control operation of each section when receiving the signal for starting continuous recording from the start of recording instructing means 19 connected to the control and calculate means or the signal for starting continuous recording from the external input terminal. The servo control circuit 12 includes a focus servo control circuit, a tracking servo control circuit, a motor servo control circuit, and a slide servo control circuit.

The focus servo control circuit and a tracking servo control circuit control the focus actuator and the tracking actuator of the optical pickup 10 to drive an object lens which is not illustrated so that a laser beam emitted from the optical pickup 10 may exactly trace the recording guide groove of the mini disk 7.

The slide servo control circuit outputs a control signal to the slide motor which is not illustrated to move the optical pickup 10 and the magnetic head 9. The motor servo control circuit outputs a control signal to the motor 11 to rotate the mini disk 7 at a constant linear velocity.

When recording EFM data on the mini disk 7, the magnetic head 9 over the mini disk 7 which is rotated by the motor 11, produces a modulated magnetic field according to the EFM data output from the EFM encoder 6.

At the same time, the optical pickup 10 opposite the magnetic head 9 with the mini disk 7 therebetween generates a laser beam whose power is high enough to heat the recording layer of the mini disk 7. With this, EFM data is recorded on the mini disk 7.

The photo diode which is not illustrated receives a laser beam reflected on the mini disk 7, converts it into a detection signal which is an electric signal, and outputs the detection signal to a reproduction amplifier which is not illustrated. The reproduction amplifier separates a focus error signal, a tracking error signal and a synchronization signal which has been recorded in the recording guide from the detection signal, and outputs each signal to the servo control circuit 12. The servo control circuit 12 outputs various control signals. The recording system is controlled as described above.

Referring, next, to how the recording system processes signals, the mini-disk recording and reproducing device 200 starts to record EFM data which was generated from the entered analog audio signal on the mini disk 7 when receiving a command to start recording from the start of recording instructing means 19 or the signal for starting continuous recording from the external input terminal.

The analog audio signal entered for the mini-disk recording and reproducing device 200 is first fed to the LPF 1. The LPF 1 has a cut-off characteristic that cuts off high-frequency components of half or higher of the sampling frequency and is provided to prevent generation of an aliasing noise at A/D conversion. The LPF 1 outputs the filtered analog audio signal to the A/D converter 2.

The A/D converter 2 samples the filtered analog audio signal at a preset sampling frequency (e.g. 44.1 KHz), quantizes it with a preset number of bits, and generates digital audio data. The A/D converter 2 outputs the digital audio data to the ATRAC encoder 3.

The ATRAC encoder 3 compresses the digital audio data and outputs the resulting digital compressed audio data to the shockproof memory system controller 4.

The shockproof memory system controller 4 outputs the digital compressed audio data to RAM 5 and causes RAM 5 to output the digital compressed audio data to the EFM encoder 6 in response to an instruction from the control and calculate means 13.

The EFM encoder 6 encodes the digital compressed audio data and supplies the resulting EFM data to the magnetic head drive circuit 8. The magnetic head drive circuit 8 drives the magnetic head 9 to cause the magnetic head to apply a modulated magnetic field on the mini disk 7 according to the EFM data.

The control and calculate means 13 controls the shock-proof memory system controller 4 to store the digital compressed audio data in RAM 5 and simultaneously instructs the servo control circuit 12 to control the position of a laser beam emitted from the optical pickup 10 so that the EFM data may be recorded in the recording guide groove of the mini disk 7.

When receiving a stop recording command from the stop recording indicating section of the operation instructing means 20, the control and calculate means 13 stops recording of EFM data which has been entered by that time, then controls the recording system to record management data such as a track name and time information in the management data area of the mini disk 7. The signal processing of the recording system is accomplished as described above.

Referring, next, to controlling of the reproduction system, to reproduce the EFM data from the mini disk 7, the optical pickup 10 having an object lens, a laser source, a photo diode and a reproduction amplifier emits a laser beam generated from the laser source to the mini disk 7 and causes the photo diode to detect the laser beam reflected on the recording layer of the mini disk 7 and to output a detection signal which is an electric signal.

The photo diode of the optical pickup 10 outputs the detection signal which is detected from the laser beam reflected on the recording layer of the mini disk 7 to the reproduction amplifier which is not illustrated. The reproduction amplifier separates a focus error signal and a tracking error signal from the detection signal, and outputs the signals respectively to the servo control circuit 12.

The reproduction amplifier outputs said separated detection signal to the address decoder 14. The address decoder 14 decodes the address data from the detection signal and outputs the resulting EFM data to the EFM decoder 15.

The focus servo circuit and the tracking servo control circuit of the servo control circuit 12 control the focus actuator and the tracking actuator of the optical pickup 10 to drive the object lens so that the laser beam may be emitted in the recording guide groove of the mini disk 7.

The motor servo control circuit of the servo control circuit 12 controls the motor 11 to rotate the mini disk 7 at a preset rotational speed. The slide servo control circuit controls the slide motor to move the optical pickup 10 to reproduce a selected one of the tracks on the mini disk 7. The controlling of the reproduction system of the mini-disk recording and reproducing device 200 is accomplished as described above.

Referring, next, to signal processing of the reproduction system, the control and calculate means 13 reads the management data from the management data area of the mini disk 7, causes the servo control circuit 12 to control the position of the optical pickup 10 to read the desired information data according to the management data, and thus reproduces the selected track when receiving a command to reproduce a certain track on the mini disk 7 from the reproduction instructing means of the operation instructing means 20.

The EFM data output from the reproduction amplifier of the optical pickup 10 is fed to the EFM decoder 15 via the address decoder 14. The EFM decoder 15 decodes the EFM data and sends the resulting digital compressed audio data to RAM 5 of the shock-proof memory system controller 4.

The shock-proof memory system controller 4 controls transferring of the digital compressed audio data to and from RAM 5. RAM 5 stores the digital compressed audio data sent from the EFM decoder 15. The shock-proof memory system controller causes RAM 5 to output the digital compressed audio data to the ATRAC decoder 16 at the time the ATRAC decoder 16 requires the data.

The ATRAC decoder 16 receives the digital compressed audio data and decompresses it to the digital audio data. The decompressed digital audio data is converted into an analog audio signal by the D/A converter 17. The resulting analog audio signal is output to the outside through the LPF 18. The signal processing of the reproduction system is accomplished as described above.

Figure 2:
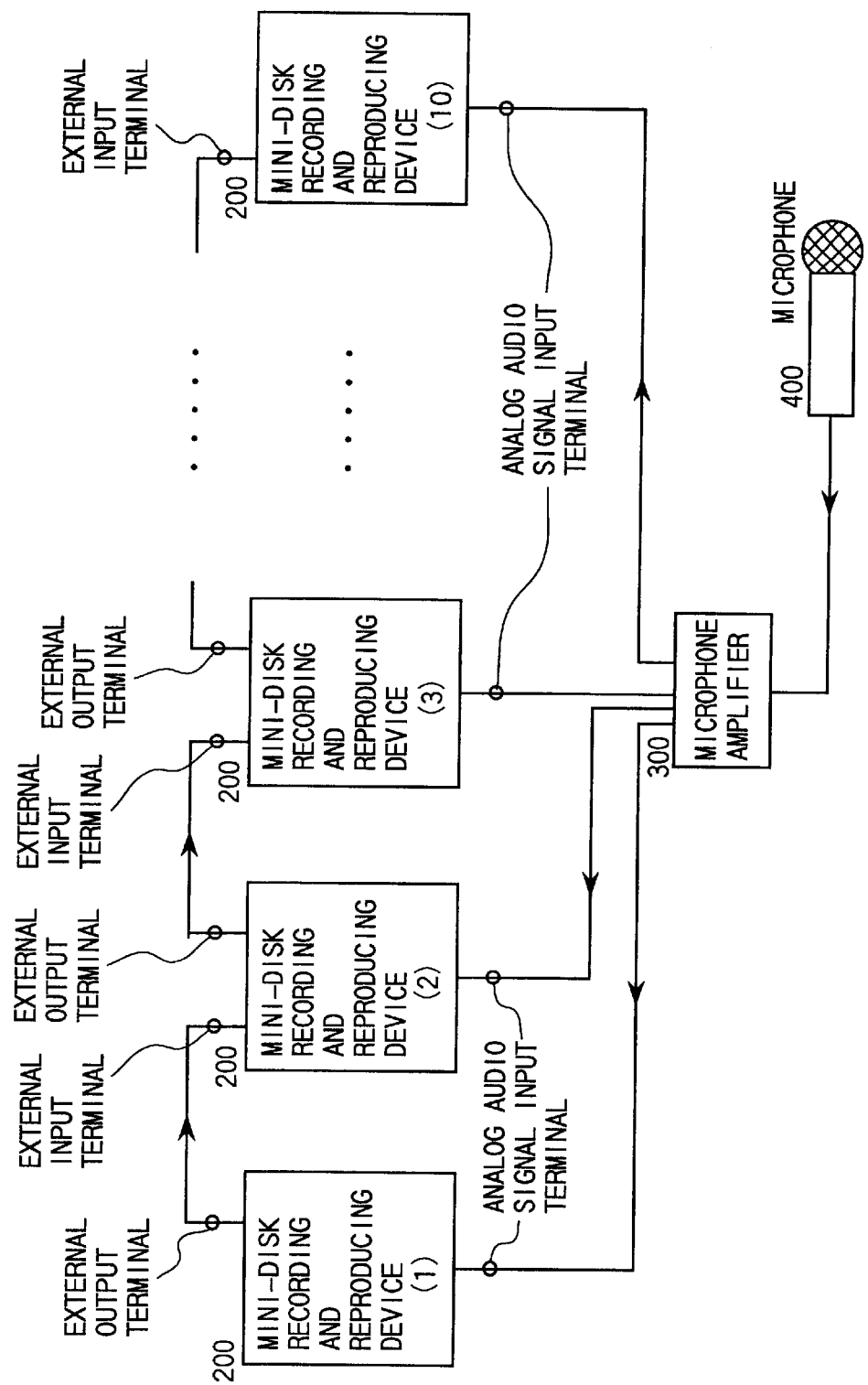
FIG. 2 is a block diagram illustrating a continuous recording system wherein ten mini-disk recording and reproducing devices of a first embodiment are connected with cables.

Referring, next, to a system for continuous recording, FIG. 2 is a block diagram illustrating a continuous recording system in which ten mini-disk recording and reproducing devices of a first embodiment are connected with cables. It is to be expressly understood, however, that the number of said mini-disk recording and reproducing devices in this embodiment is not intended as a definition of the limits of this invention. The continuous recording system has only to contain at least two mini-disk recording and reproducing devices.

Every mini-disk recording and reproducing device has a mini disk. The explanation below assumes that the mini-disk recording and reproducing device (i) (where "i" is an integer of 1 to 10) has an "i"-th mini-disk.

In this continuous recording system, the external output terminal of the mini-disk recording and reproducing device (1) is connected to the external output terminal of the mini-disk recording and reproducing device (2) with a cable. The external output terminal of the mini-disk recording and reproducing device (2) is connected to the external output terminal of the mini-disk recording and reproducing device (3) with a cable. In this way, mini-disk recording and reproducing devices are connected serially with cables. Finally the external output terminal of the mini-disk recording and reproducing device (9) is connected to the external output terminal of the mini-disk recording and reproducing device (10) with a cable.

As mini-disk recording and reproducing devices (1) to (10) are connected in series with cables, this system can record the EFM data continuously in these mini-disk recording and reproducing devices.

The analog audio signal input terminal of every mini-disk recording and reproducing device is connected to the microphone amplifier 300 with an analog audio signal cable. The microphone amplifier 300 amplifies an analog audio signal output from the microphone 400 and sends the amplified analog audio signal to every mini-disk recording and reproducing device. It is to be expressly understood, however, that the use of a microphone amplifier as an analog signal source in this embodiment is not intended as a definition of the limits of this invention. The analog signal source can be a CD player, an MD player, a tuner, a cassette tape player, and so on.

Figure 3:
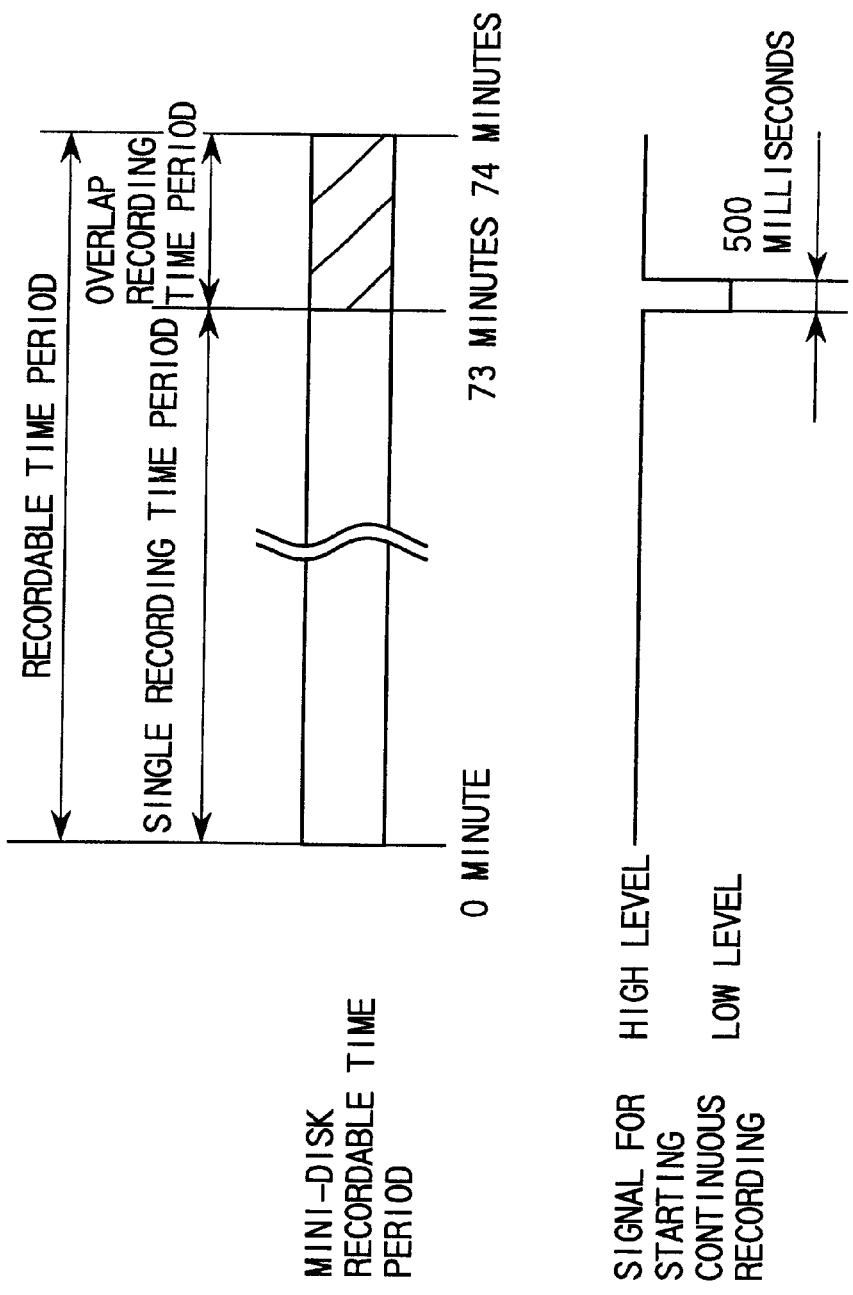
FIG. 3 is an explanatory drawing illustrating the relationship between the overlap recording time period of a mini disk and the output of a signal for starting continuous recording.

Referring to data recording by this system, FIG. 3 illustrates the relationship between the overlap recording time of the mini disk and the output of the signal for starting continuous recording. A mini disk can record stereophonically data for 74 minutes and monaurally data for 148 minutes. The explanation below assumes stereophonic recording, however, it can be substituted by monaural recording.

When a "i"-th mini disk is installed in the mini-disk recording and reproducing device (i), the control and calculate means 13 of the mini-disk recording and reproducing device (i) controls the recording and reproducing means 100 to read the management data from the management data area of the "i"-th mini disk. The control and calculate means 13 of the mini-disk recording and calculate device (i) calculates a recordable time period of the "i"-th mini disk from the management data related to the free area in the management data which was read. For simplicity, the explanation below assumes that all mini disks set on the mini-disk recording and reproducing devices are brand new and can record stereophonically data for 74 minutes on each mini disk.

The control and calculate means 13 of the mini-disk recording and reproducing device (i) calculates a single recording time period by subtracting an overlap recording time period preset by the overlap recording time period setting means 21 from the recordable time. The recordable time period of a single mini disk consists of a single recording time period which data is recorded singly on the mini disk and an overlap recording time period during which data is recorded on both this mini disk and the succeeding mini disk.

In this embodiment, an overlap recording time period of one minute, for example, is preset by the overlap recording time period setting means 21. However, it is possible to set any overlap recording time period greater than 0 by the overlap recording time period setting means 21. When the preset overlap recording time period is 1 minute, the single recording time period is 73 minutes which is the difference between the recordable time period of 74 minutes and the overlap recording time period of 1 minute.

When a single recording time period has passed after start of recording, the control and calculate means 13 of the mini-disk recording and reproducing device (i) outputs a signal for starting continuous recording to the control and calculate means 13 of the next mini-disk recording and reproducing device (i+1) as illustrated in FIG. 3. The signal for starting continuous recording of this embodiment is a pulse signal which becomes low level for about 500 milliseconds after it became high level. Immediately when this signal goes low level, the control and calculate means 13 of the next mini-disk recording and reproducing device (i+1) detects the reception of the signal for starting continuous recording and controls to cause the recording and reproducing means 100 of the mini-disk recording and reproducing device (i+1) to start continuous recording (except when "i" is 10).

Figure 4:
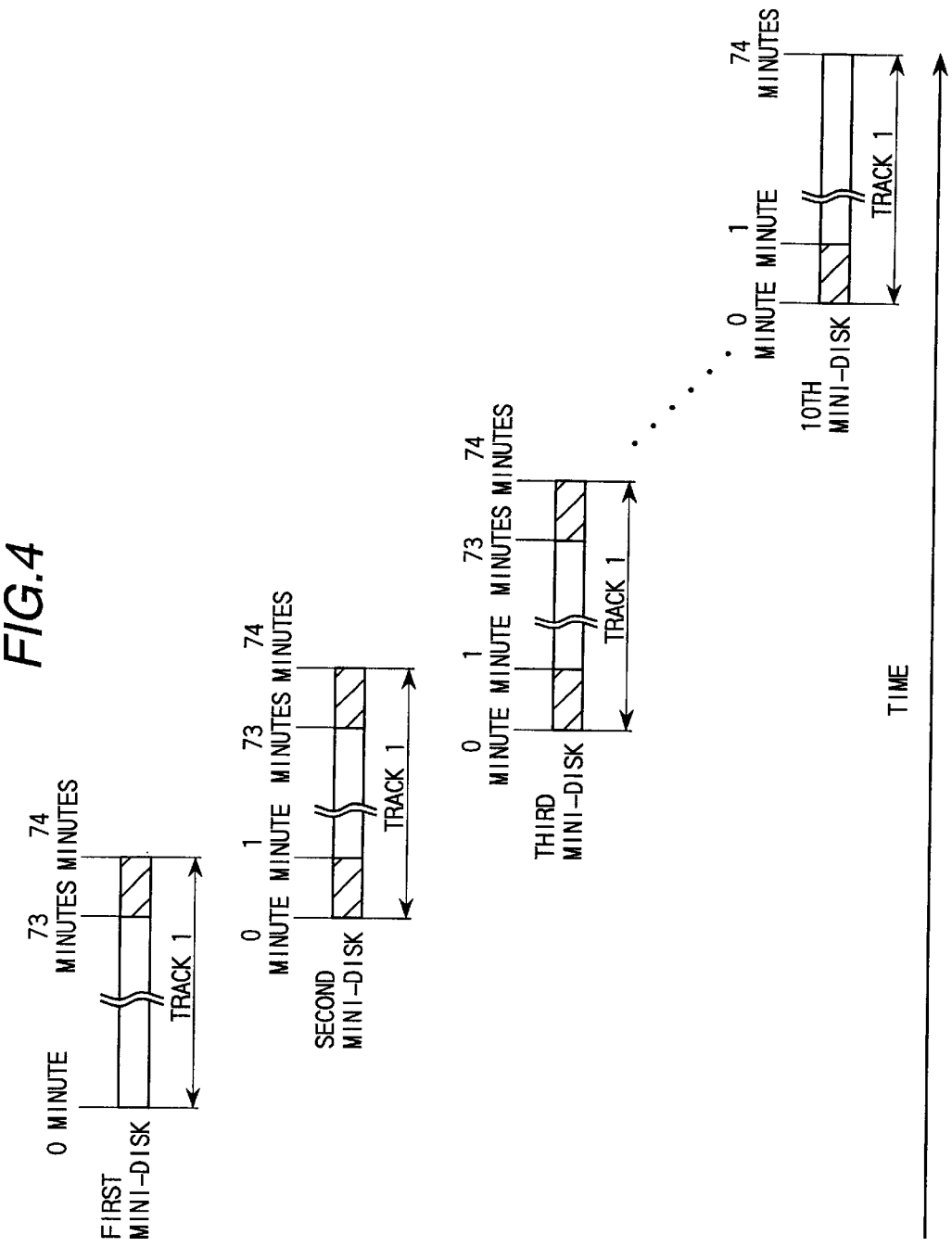
FIG. 4 is an explanatory drawing illustrating the relationship between the overlap recording time periods and tracks of a first mini disk to a tenth mini disk according to a first management data generated by the control and calculate means 13.

FIG. 4 explains the relationship between a track and an overlap recording time period of each mini disk (1 to 10) according to the first management data generated by the control and calculate means 13. The control and calculate means 13 of the mini-disk recording and reproducing device (1) controls the recording and reproducing means 100 to start recording information data on the first mini disk. After 73 minutes which is a single recording time period, the control and calculate means 13 of the mini-disk recording and reproducing device (1) outputs the signal for starting continuous recording to the control and calculate means 13 of the mini-disk recording and reproducing device (2).

The control and calculate means 13 of the mini-disk recording and reproducing device (2) detects the reception of the signal for starting continuous recording and controls to cause the recording and reproducing means 100 of mini disk recording and reproducing device (2) to start recording information data. When an overlap recording time has passed after outputting the signal for starting continuous recording to the mini-disk recording and reproducing device (2), the control and calculate means 13 of the next mini-disk recording and reproducing device (1) controls the recording and reproducing means 100 of the mini-disk recording and reproducing device (1) to end recording.

In this way, the signal for starting continuous recording is output from the mini-disk recording and reproducing device (1) to the mini-disk recording and reproducing device (2), from the mini-disk recording and reproducing device (2) to the mini-disk recording and reproducing device (3), and so on to the last mini-disk recording and reproducing device (10). The control and calculate means 13 of each mini-disk recording and reproducing device (1) to (10) controls the recording and reproducing means 100 of each mini-disk recording and reproducing device to continuously record information data on a mini disk installed on each mini-disk recording and reproducing device.

A time period between the output of the signal for starting continuous recording from the control and calculate means 13 of a mini-disk recording and reproducing device (i) and the start of continuous recording by the control and calculate means 13 of the next mini-disk recording and reproducing device (i+1) is termed as a delay time period. This delay time period may vary as it is dependent upon the requirement of respective mini-disk recording and reproducing devices.

As identical information data is recorded on a mini disk and the succeeding mini disk in this delay time period, the loss of information data in the delay time period can be avoided. This can make setting of recording timing less exact.

When an overlap recording time period of one minute is preset by the overlap recording time period setting means 21, the overlap recording time period of the mini-disk recording and reproducing device (i) is 1 minute minus the delay time. However, to simplify the figure, FIG. 4 assumes that the overlap recording time period of the mini-disk recording and reproducing device (i) is 1 minute.

As any overlap recording time period can be set by the overlap recording time period setting means 21, it is possible to assure continuous overlap of information data by making the overlap recording time period longer than the delay time period even when the delay time period is long.

The control and calculate means 13 of each mini-disk recording and reproducing device (1) to (10) generates the first management data for track 1 of 74 minutes long. The recording and reproducing means 100 of every mini-disk recording and reproducing device (1) to (10) is controlled to record said first management data.

Some of the mini-disk recording and reproducing devices detect a mute part in the entered analog signal and automatically create a track. However, when detecting more than 255 mute parts, the recording and reproducing means stops recording. This is because management data of 256 tracks or more cannot be generated. The mini-disk recording and reproducing device of this embodiment will not stop recording when detecting 256 or more mute parts because the device will not create a track when detecting a mute part.

In FIG. 4, the trailing 1-minute part of a first mini disk and the leading 1-minute part of a second mini disk have identical information data recorded there. The trailing 1-minute part of a second mini disk and the leading 1-minute part of a third mini disk have identical information data recorded there. And so on, finally the trailing 1-minute part of a ninth mini disk and the leading 1-minute part of a tenth mini disk have identical information data recorded there. Consequently, a total overlap recording time period is 9 minutes. A total recording time period by the first management data generated by each control and calculate means 13 is 731 minutes.

Referring, next, to a second management data generated by the control and calculate means 13 which is another example using said system, a second management data generated by the control and calculate means 13 manages as one track for information data recorded in a overlap recording time period between the output of the signal for starting continuous recording and the end of recording, as shown in FIG. 3.

Figure 5:
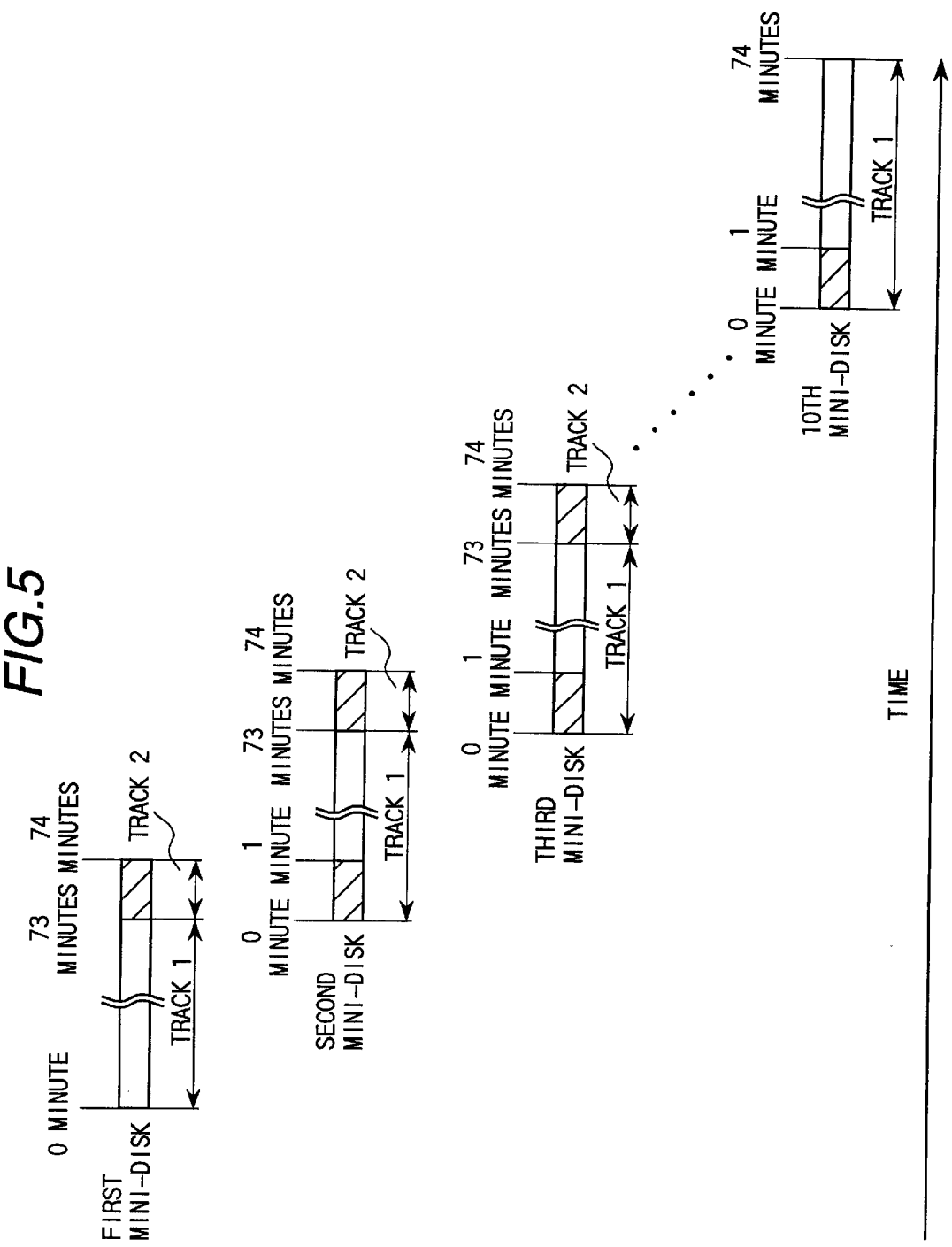
FIG. 5 is an explanatory drawing illustrating the relationship between the overlap recording time periods and tracks of the first mini disk to the tenth mini disk according to a second management data generated by the control and calculate means 13.

FIG. 5 illustrates the relationship of overlap recording time periods and tracks of the mini-disk recording and reproducing devices (1) to (10) to be managed by a second management data generated by the control and calculate means 13.

The control and calculate means 13 of respective mini-disk recording and reproducing devices (1) to (9) generates management data for a first track of information data recorded in a single recording time period between the start of recording and the output of a signal for starting continuous recording and for an second track of information data recorded for a overlap recording time period after the signal for starting continuous recording is output and controls each recording and reproducing means 100 to record a second management data on each mini disk.

The control and calculate means 13 of the mini-disk recording and reproducing device (10) generates a management data for a first track of information data which is recorded in a time period between the start of recording and the end of recording and controls the recording and reproducing means 100 to record management data on the mini disk. To keep the mini-disk recording and reproducing device (10) from generating a track of the overlap recorded information data, set an overlap recording time period of 0 minute by the overlap recording time period setting means 21 of the mini-disk recording and reproducing device 10. In this case, the control and calculate means 13 generates an track for a overlap recording time period of 0 minute. In other words, no track is generated for the overlap recorded information data and consequently, the recordable time period is equal to the single recording time period.

As the second management data generated by each control and calculate means 13 manages information data in an overlap recording time period as one track, the information data that are recorded on the current disk and on the succeeding disk can be accessed track by track. Therefore, the overlap recorded information data can be recognized easily. Also for the second management data generated by the control and calculate means 13, the total overlap recording time period of the whole system is 9 minutes and the total recording time period is 731 minutes.

Figure 6:
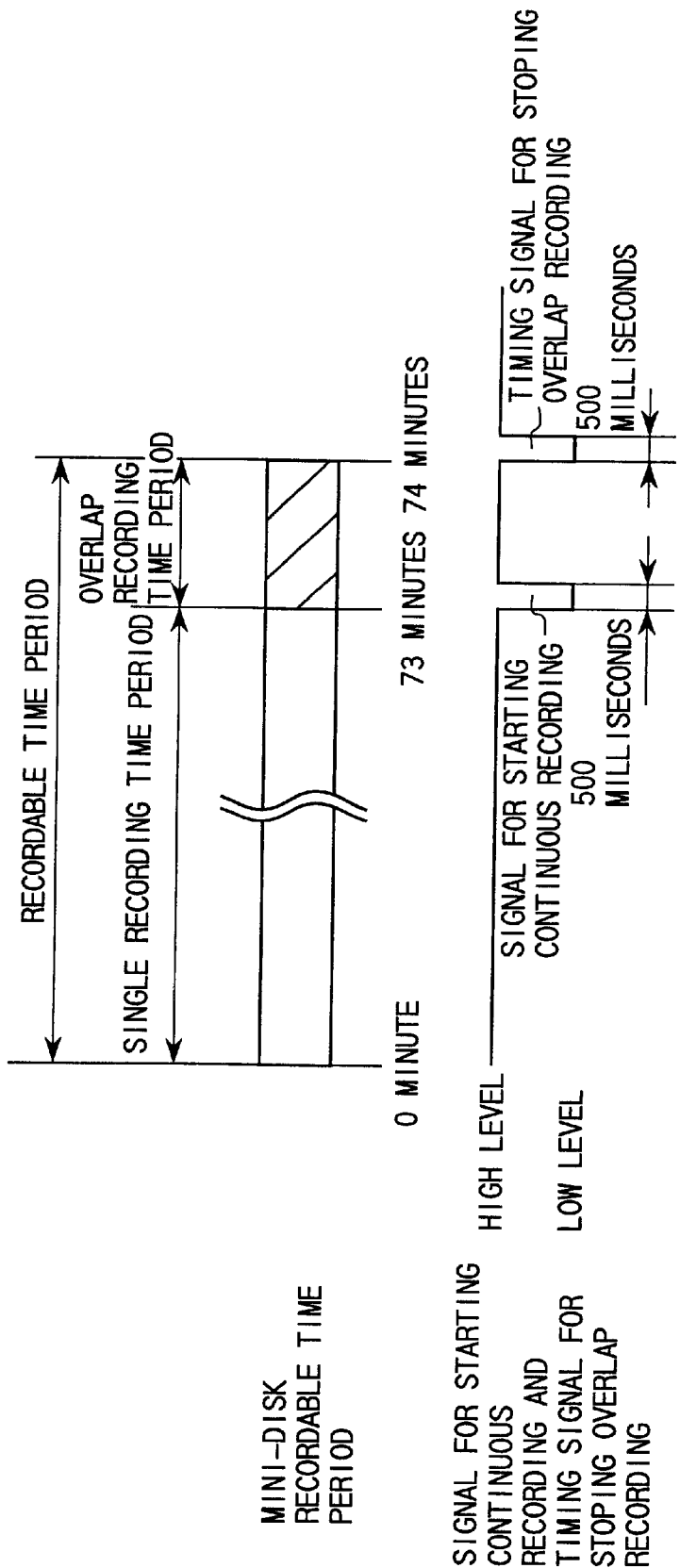
FIG. 6 is an explanatory drawing illustrating the relationship of the overlap recording time period of a mini disk and the output of a signal for starting continuous recording and a timing signal for stopping overlap recording.

Referring, next, to a third management data generated by the control and calculate means 13 which is another example using said system, the third management data also manages information data which is recorded on the current mini disk and the succeeding mini disk as one track. FIG. 6 illustrates the relationship of overlap recording time periods, the signals for starting continuous recording and the timing signal for stopping overlap recordings of the mini disks.

When a single recording time period passed by after start of recording, the control and calculate means 13 of the mini-disk recording and reproducing device (i) outputs the signal for starting continuous recording to the control and calculate means 13 of the next mini-disk recording and reproducing device (i+1) as illustrated in FIG. 6. The signal for starting continuous recording of this embodiment is a pulse signal which becomes low level for about 500 milliseconds after it became high level. Immediately when this signal goes low level, the next mini-disk recording and reproducing device (i+1) controls the recording and reproducing means 100 to start continuous recording (except when "i" is 10).

When an overlap recording time period after the output of the signal for starting continuous recording, the control and calculate means 13 of the mini-disk recording and reproducing device (i) outputs a timing signal for stopping overlap recording to the control and calculate means 13 of the next mini-disk recording and reproducing device (i+1) as illustrated in FIG. 6. The timing signal for stopping overlap recording of this embodiment is a pulse signal which becomes low level for about 500 milliseconds after it became high level.

Immediately when this signal goes low level, the next mini-disk recording and reproducing device (i+1) generates management data to change a track number (except when "i" is 10).

Figure 7:
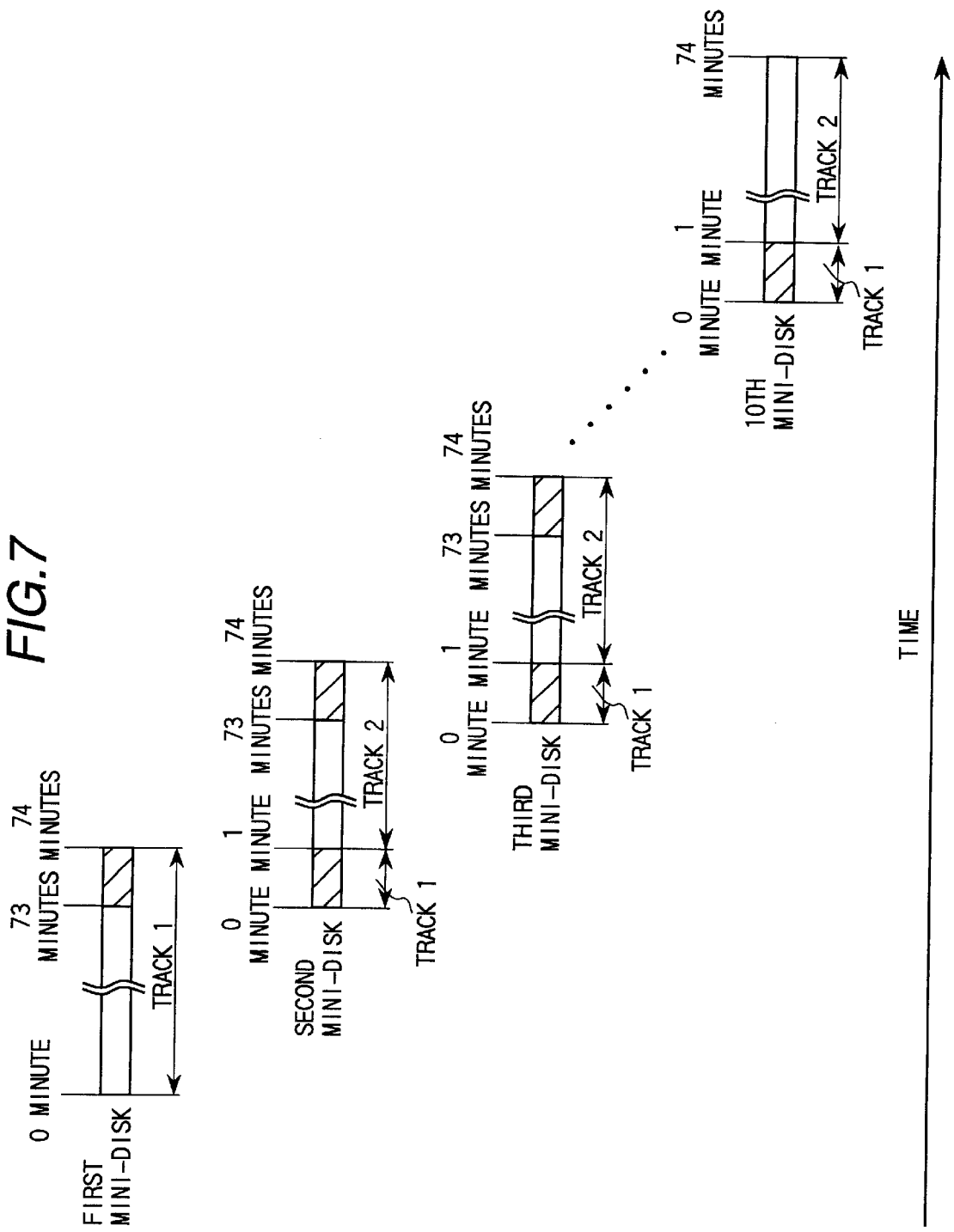
FIG. 7 is an explanatory drawing illustrating the relationship between the overlap recording time periods and tracks of the first mini disk to the tenth mini disk according to a third management data generated by the control and calculate means 13.

FIG. 7 explains the relationship between tracks and overlap recording time periods of the first to tenth mini disks according to the third management data generated by the control and calculate means 13. The control and calculate means 13 of the mini-disk recording and reproducing device (1) judges that there is no overlap recorded information data as the mini-disk recording and reproducing device (1) dose not receive a timing signal for stopping overlap recording, generates a third management data which manages a time period between the start of recording and the end of recording as one track, and controls the recording and reproducing section 100 to record the third management data on the mini disk.

The control and calculate means 13 of respective mini-disk recording and reproducing devices (2) to (10 generates the third management data which manages such as a first track of information data which is recorded in the leading overlap recording time period and a second track of information data which recorded in the remainder time period and controls each recording and reproducing means 100 to record the third management data on the mini disk.

The third management data generated by each control and calculate means 13 is also management data which manages information data recorded in the overlap recording time period as one track. The information data that are recorded on the current disk and on the succeeding disk can be accessed track by track. Therefore, the overlap recorded information data can be recognized easily. Also for the third management data generated by the control and calculate means 13, the total overlap recording time period of the whole system is 9 minutes and the total recording time period is 731 minutes.

Referring to the third management data generated by each control and calculate means 13, the control and calculate means 13 of the mini-disk recording and reproducing device (i) can measure a time period between the fall of the received signal for starting continuous recording and the fall point of the received timing signal for stopping overlap recording and use the time period as an overlap recording time period. In this case, the overlap recording time period preset by the mini-disk recording and reproducing device (1) is transferred to the last mini-disk recording and reproducing device (10). The operator can set the overlap recording time period of all mini-disk recording and reproducing devices by setting the overlap recording time period by the overlap recording time period setting means 21 of the mini-disk recording and reproducing device (1).

Figure 8:
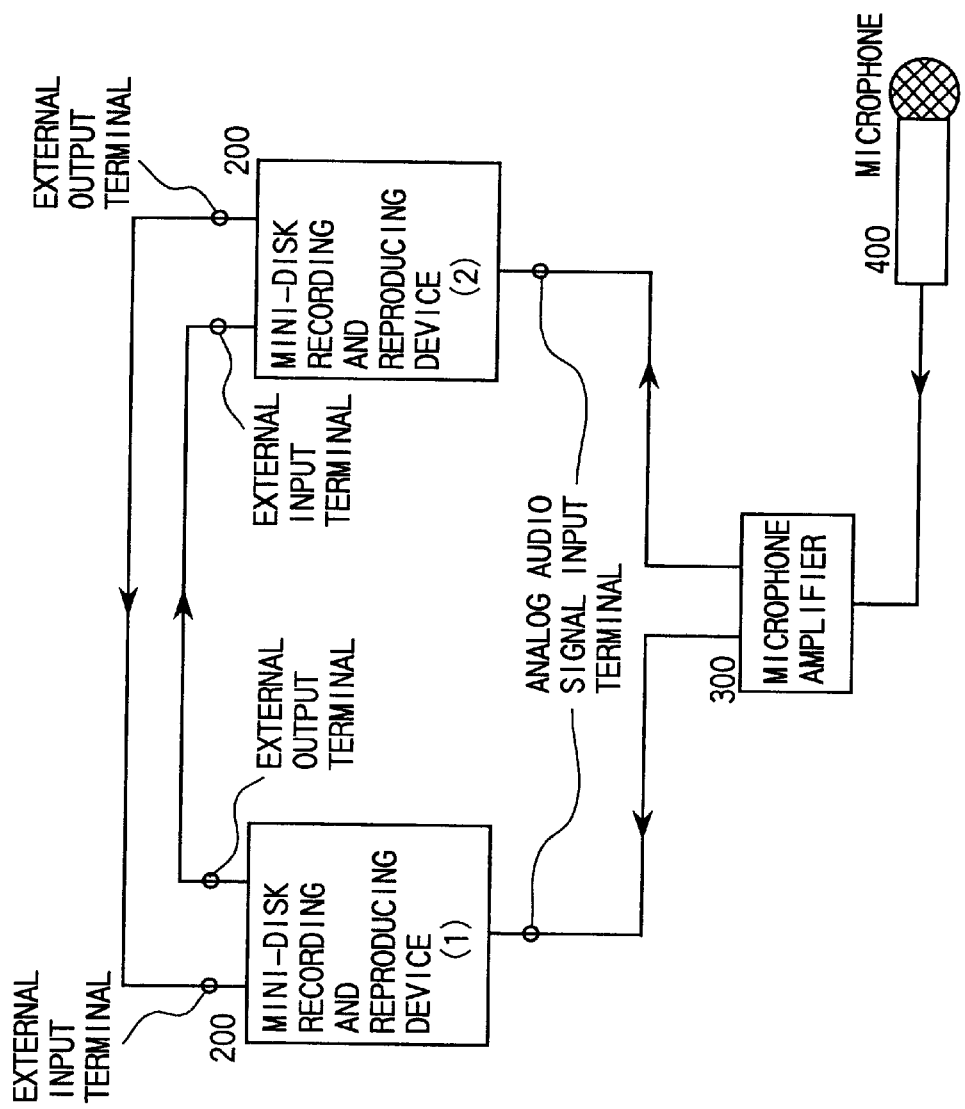
FIG. 8 is a block diagram illustrating a continuous recording system wherein two mini-disk recording and reproducing devices of a first embodiment are connected with cables.

FIG. 8 is a block diagram illustrating a continuous recording system wherein two mini-disk recording and reproducing devices of a first embodiment are connected with cables.

Assuming that the mini-disk recording and reproducing devices (1) and (2) have mini disks in them, when the operator enters a command to start recording, the recording and reproducing means 100 of the mini-disk recording and reproducing device (1) starts recording. The control and calculate means 13 of the mini-disk recording and reproducing device (1) outputs a signal for starting continuous recording to the control and calculate means 13 of the mini-disk recording and reproducing device (2). The control and calculate means 13 of the mini-disk recording and reproducing device (2) controls the recording and reproducing means 100 of the mini-disk recording and reproducing device to continuously record information data on the mini disk.

The control and calculate means 13 of the mini-disk recording and reproducing device (1) controls the recording and reproducing means 100 to stop recording when the overlap recording time period goes by. The operator can take out the recorded mini disk from the mini-disk recording and reproducing device (1) and set a new mini disk in the mini-disk recording and reproducing device (1) while the mini-disk recording and reproducing device (2) is recording information data.

Then, the control and calculate means 13 of the mini-disk recording and reproducing device (2) outputs a signal for starting continuous recording to the control and calculate means 13 of the mini-disk recording and reproducing device (1) and the control and calculate means 13 of the mini-disk recording and reproducing device (1) controls the recording and reproducing means 100 of the mini-disk recording and reproducing device (1) to start continuous recording information data on the mini disk.

Each mini-disk recording and reproducing device (1) and (2) records the first management data, the second management data or the third management data.

As long as the system has at least two mini-disk recording and reproducing devices and the mini disks are to be replaced by new ones by the operator, continuous data recording is accomplished. When the system contains more mini-disk recording and reproducing devices, the number of replacements of mini disks can be reduced as more mini disks can be replaced at a time.

Figure 9:
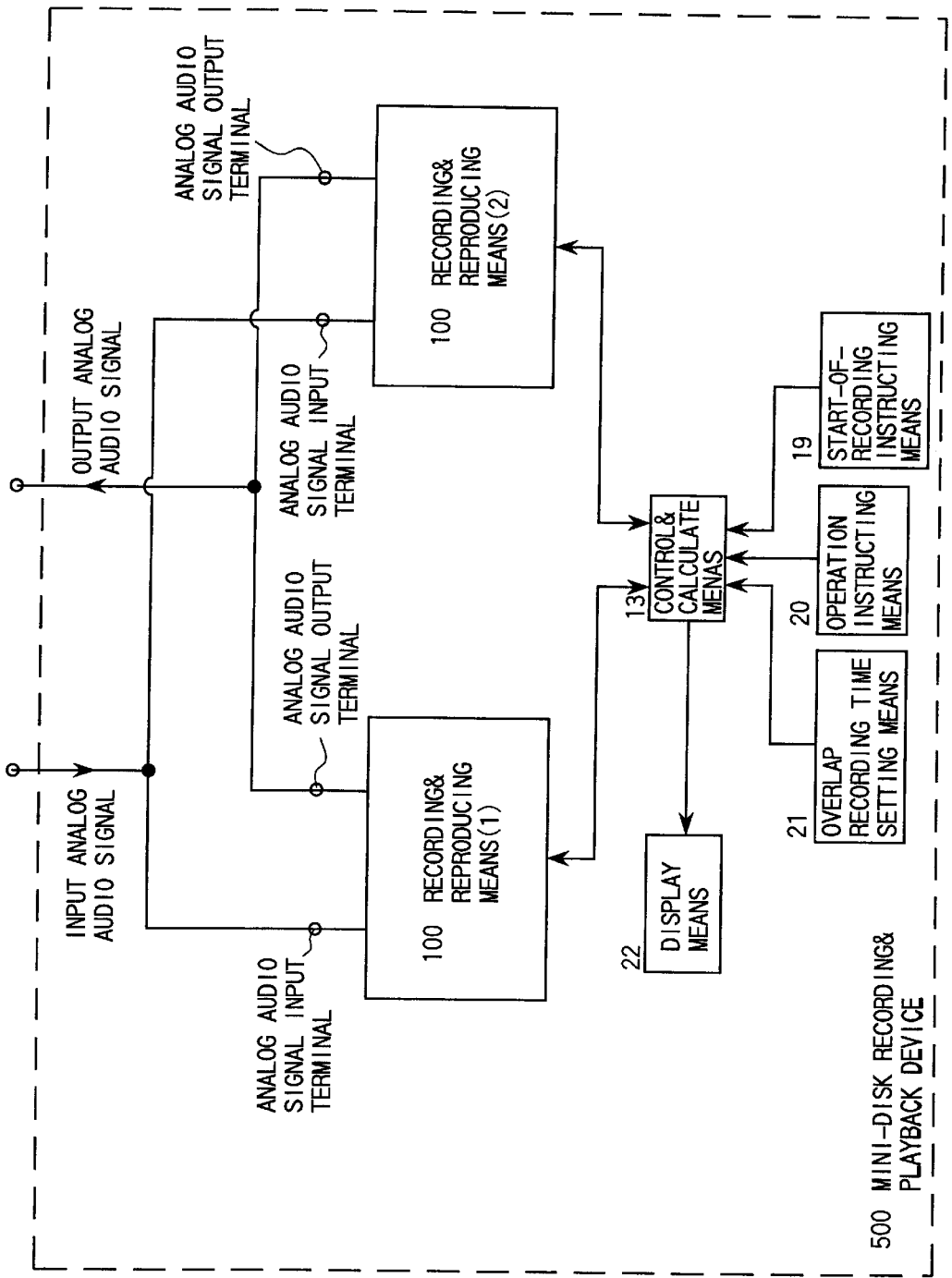
FIG. 9 is a block diagram illustrating a mini-disk recording and reproducing device which is a second embodiment of the present invention.

FIG. 9 is a block diagram of a mini-disk recording and reproducing device of which a second preferred embodiment of this invention is a part. The mini-disk recording and reproducing device 500 of this embodiment has two recording and reproducing means 100 according to the first embodiment.

The two recording and reproducing means 100 simultaneously receive an analog audio signal through their analog audio signal input terminals. One of the two recording and reproducing means 100 outputs an analog audio signal to the other recording and reproducing means from the analog audio signal output terminal. It is possible to provide an output selection switch which is not illustrated and to switch between outputs from these two recording and reproducing means by the control and calculate means 13. The two recording and reproducing means 100 are connected to the control and calculate means 13. The control and calculate means 13 controls the operations of these two recording and reproducing means 100.

The control and calculate means 13 are connected to a start of recording instructing means 19 that instructs to start recording an analog signal that is entered to said mini-disk recording and reproducing device 500, an operation instructing means 20 equipped with push-button switches consisting of a reproducing instructing means, a stop instructing means, a track forward-search instructing means, a track reverse-search instructing means, and a pause instructing means, an overlap recording time period setting means 21 which sets an overlap recording time period, and a display means 22 which displays various kinds of information. Recording/reproducing controlling and signal processing of the recording and reproducing means 100 are the same as those of the mini-disk recording and reproducing device of the first embodiment and the explanation is omitted here. Thus the mini-disk recording and reproducing device 500 of the second embodiment is explained.

Referring to continuous recording by the mini-disk recording and reproducing device 500 of the second embodiment, the mini-disk recording and reproducing device 500 of the second embodiment alternately uses the recording and reproducing means (1) and the recording and reproducing means (2) to record. First, the recording and reproducing means (1) and (2) install mini disks.

The control and calculate means 13 controls the recording and reproducing means (1) to start recording. When a single recording time period passed by after the recording and reproducing means (1) starts recording, the control and calculate means 13 outputs a signal for starting continuous recording to the recording and reproducing means (2) so as to cause the recording and reproducing means (2) to start continuously recording.

When an overlap recording time period passes by after the recording and reproducing means (2) starts continuous recording, the control and calculate means 13 controls the recording and reproducing means (1) to stop recording. The operator removes the recorded mini disk from the recording and reproducing means (1) and replaces it with a new mini disk in the recording and reproducing means (1).

When a single recording time period has passed after the recording and reproducing means (2) starts recording, the control and calculate means 13 outputs the signal for starting continuous recording to the recording and reproducing means (1) and controls the recording and reproducing means (1) to start continuous recording.

When an overlap recording time period passes by after the recording and reproducing means (1) starts continuous recording, the control and calculate means 13 controls the recording and reproducing means (2) to stop recording. The operator removes the recorded mini disk from the recording and reproducing means (2) and replaces it with a new mini disk in the recording and reproducing means (2).

By repeating the above steps using the recording and reproducing means (1) and the recording and reproducing means (2) alternately, the information data is recorded continuously. As explained in the example of said first embodiment, the mini disks are recorded the first, second, or third management data.

It is to be expressly understood, however, that the provision of two recording and reproducing means in a single mini-disk recording and reproducing device in this embodiment is not intended as a definition of the limits of this invention. The mini-disk recording and reproducing device can have three or more recording and reproducing means. When the mini-disk recording and reproducing device can contain more mini disks, the operator can install more mini disks at a time. Therefore the number of installation steps can be reduced.

Figure 10:
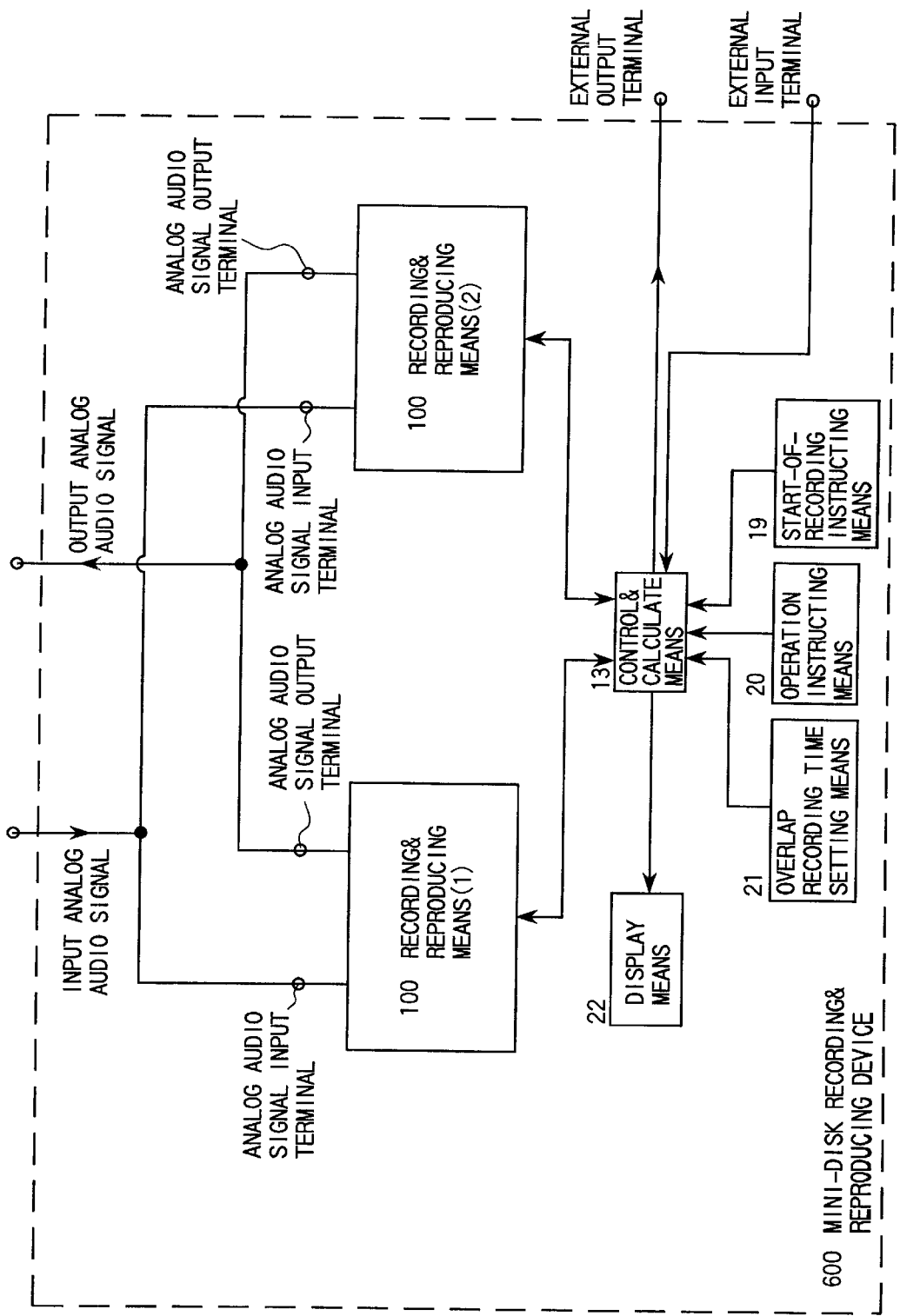
FIG. 10 is a block diagram illustrating a mini-disk recording and reproducing device which is a third embodiment of the present invention.

FIG. 10 is a block diagram of a mini-disk recording and reproducing device of which a third preferred embodiment of this invention is a part. The mini-disk recording and reproducing device 600 of this embodiment comprises a mini-disk recording and reproducing device of the second embodiment, an external output terminal, and an external input terminal.

The two recording and reproducing means 100 simultaneously receive an analog audio signal through their analog audio signal input terminals. One of the two recording and reproducing means 100 outputs an analog audio signal to the other recording and reproducing means from the analog audio signal output terminal. The control and calculate means 13 controls the operations of these two recording and reproducing means 100.

The control and calculate means 13 are connected to a start of recording instructing means 19 that instructs to start recording an analog signal that is entered to said mini-disk recording and reproducing device 600, an operation instructing means 20 equipped with push-button switches consisting of a reproducing instructing means, a stop instructing means, a track forward-search instructing means, a track reverse-search instructing means, and a pause instructing means, an overlap recording time period setting means 21 which sets an overlap recording time period, and a display means 22 which displays various kinds of information. Recording/reproducing controlling and signal processing of the recording and reproducing means 100 are the same as those of the mini-disk recording and reproducing device of the first embodiment and the explanation is omitted here.

Further the mini-disk recording and reproducing device 600 has an external output terminal for sending a signal for starting continuous recording and a timing signal for stopping overlap recording to the outside from the control and calculate means 13 and an external input terminal for receiving a signal for starting continuous recording and a timing signal for stopping overlap recording from the outside and transferring these signals to the control and calculate means 13. Thus the mini-disk recording and reproducing device 600 of the third embodiment is explained.

Figure 11:
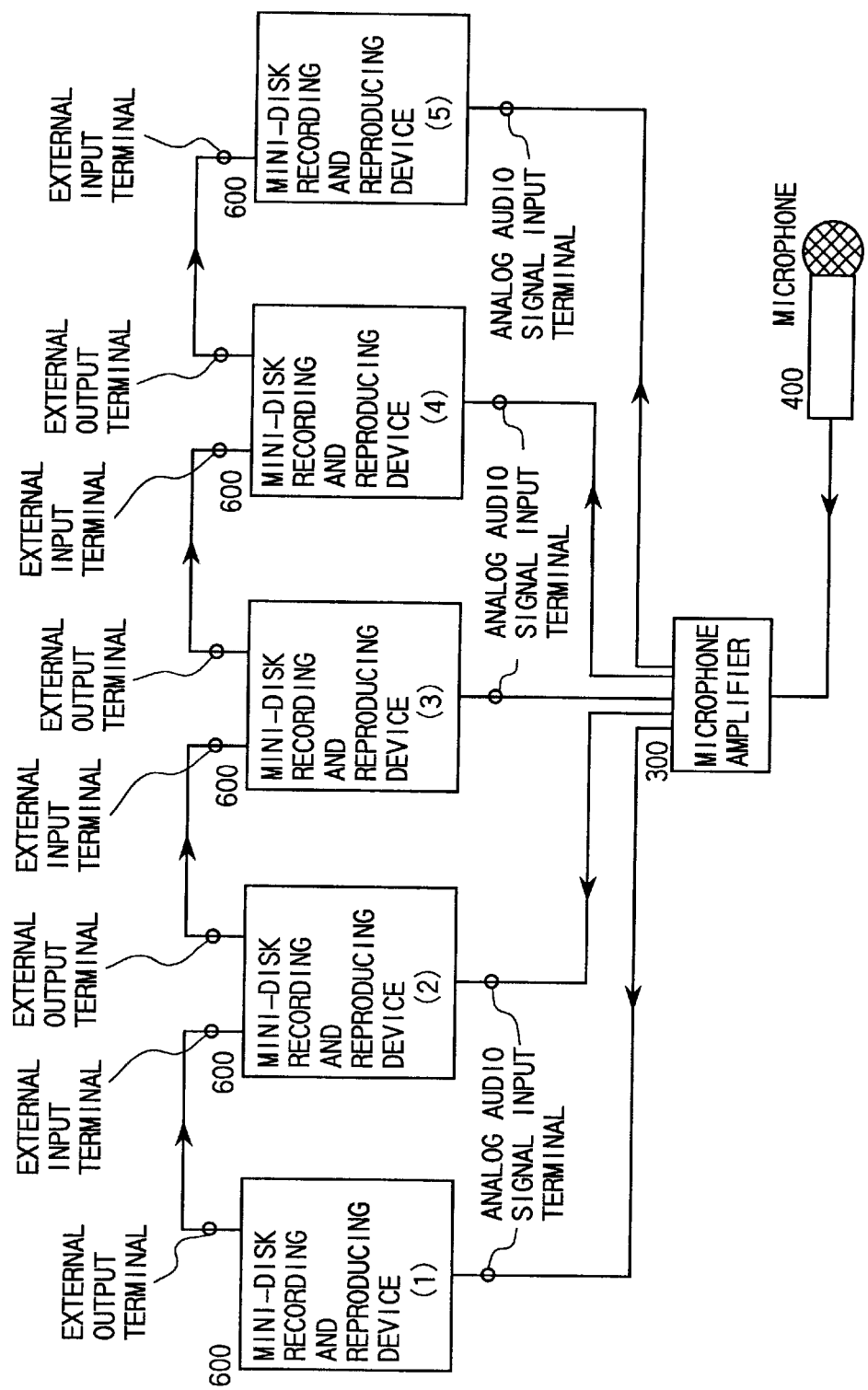
FIG. 11 is a block diagram illustrating a continuous recording system wherein five mini-disk recording and reproducing devices of a third embodiment are connected with cables.

Referring to continuous recording by the mini-disk recording and reproducing device 600 of the third embodiment, FIG. 11 is a block diagram of a continuous recording system in which five mini-disk recording and reproducing devices of the third embodiment are connected with cables.

The analog audio signal input terminal of every mini-disk recording and reproducing device is connected to a microphone amplifier 300 with an analog audio signal cable.

The microphone amplifier 300 amplifies an analog audio signal output from the microphone 400 and outputs the amplified analog audio signal to every mini-disk recording and reproducing device.

This system records data first on a first mini disk in the recording and reproducing means (1) and on a second mini disk in the recording and reproducing means (2) of the mini-disk recording and reproducing device (1), next on a third mini disk in the recording and reproducing means (1) and on a fourth mini disk in the recording and reproducing means (2) of the mini-disk recording and reproducing device (2), and so on.

Finally, the system records information data on a tenth mini disk in the recording and reproducing means (2) of the mini-disk recording and reproducing device (5).

Initially, mini disks are installed in the recording and reproducing means (1) and (2) of every mini-disk recording and reproducing device. When the operator enters a command to start recording, the control and calculate means 13 of the mini-disk recording and reproducing device (1) controls the recording and reproducing means (1) to start recording.

When a single recording time passes by after the recording and reproducing means (1) of the mini-disk recording and reproducing device (1) starts to recording, the control and calculate means 13 of the mini-disk recording and reproducing device (1) outputs a signal for starting continuous recording to the recording and reproducing means (2) of the mini-disk recording and reproducing device (1) and controls the recording and reproducing means (2) of the mini-disk recording and reproducing device (1) to start continuous recording.

When overlap recording time period has passed after the recording and reproducing means (2) of the mini-disk recording and reproducing device (1) starts continuous recording, the control and calculate means 13 of the mini-disk recording and reproducing device (1) controls the recording and reproducing means (1) of the mini-disk recording and reproducing device (1) to stop recording.

When a single recording time passes by after the recording and reproducing means (1) of the mini-disk recording and reproducing device (1) starts recording, the control and calculate means 13 of the mini-disk recording and reproducing device (1) outputs the signal for starting continuous recording to the control and calculate means 13 of the mini-disk recording and reproducing device (2) through the external output terminal.

When receiving the signal for starting continuous recording, the control and calculate means 13 of the mini-disk recording and reproducing device (2) controls the recording and reproducing means (1) of the mini-disk recording and reproducing device (2) to start continuous recording. When an overlap recording time period passes by after the recording and reproducing means (1) of the mini-disk recording and reproducing device (2) starts continuous recording, the control and calculate means 13 of the mini-disk recording and reproducing device (1) controls the recording and reproducing means (2) of the mini-disk recording and reproducing device (1) to stop recording.

The above steps are repeated continuously until recording on the recording and reproducing means (2) of the mini-disk recording and reproducing device (5) is completed. The recorded mini disks are recorded the first, second, or third management data which was generated by the control and calculate means 13 as described in said first embodiment.

This embodiment is explained using five mini-disk recording and reproducing devices each of which contains two recording and reproducing means for continuous recording. It is to be expressly understood, however, that the provision of two recording and reproducing means in a single mini-disk recording and reproducing device in this embodiment is not intended as a definition of the limits of this invention. The mini-disk recording and reproducing device can have three or more recording and reproducing means. Similarly, the system can have two or more mini-disk recording and reproducing devices and the number of mini-disk recording and reproducing devices is not limited to five.

Having described preferred embodiments of this invention using mini-disk recording and reproducing devices, it is believed obvious that modification and variation of the present invention is possible without departing from the spirit and scope thereof. For example, the mini-disk recording and reproducing devices can be substituted with information media recording devices which record on video tape, integrated circuit (IC) memory, or digital versatile disk random access memory (DVD RAM).

Further, referring to continuous recording by two information media recording devices which use different kinds of media such as mini disks and video tape, delay periods of the information media recording devices may greatly vary according to the types of media used. However, as the overlap recording time period is controlled by the overlap recording time period setting means 21, the optimum overlap recording time period can be set without being affected by the length of the delay period. Therefore, continuous recording can be accomplished by combinations of information media recording devices having different delay time periods.

As mentioned above, according to the present invention, it is provided a recording device for information media that can continuously record information data onto a plurality of information media without recording any particular information pertaining to continuous recording and without losing any part of information data.

What is claimed is:

1. A recording device for information media which records information data and management data on information media having an information data area for recording information data and a management data area for recording management data, comprising:

a recording and reproducing means for recording information data or management data onto information media and reproducing information data or management data from information media, an overlap recording time period setting means for setting an overlap recording time period, and a control and calculate means for calculating a single recording time period from a recordable time period obtained from the management data of said information media and the overlap recording time period which is set by said overlap recording time period setting means, outputting a signal for starting continuous recording when a time period lapsed after the start of recording of information data onto said information media is equal to the single recording time period, and controlling said recording and reproducing means to stop recording the information on said information media when the time period lapsed from the output of the signal for starting continuous recording is equal to said overlap recording time period.

2. A recording device for information media according to claim 1, said recording device is equipped with an output terminal to output said signal for starting continuous recording.

3. A recording device for information media according to claim 1, wherein said overlap recording time period setting means variably sets an overlap recording time period.

4. A recording device for information media according to claim 1, wherein said control and calculate means outputs a timing signal for stopping overlap recording when a time period lapsed after recording of said information data onto said information media is equal to said recordable time period.

5. A recording device for information media according to claim 1, wherein said control and calculate means controls said recording and reproducing means to record said management data which manages said information data recorded in said information area as one track, on said management data area of said information media.

6. A recording device for information media according to claim 1, wherein said control and calculate means controls said recording and reproducing means to record said management data, which manages said information data recorded in an information data area as a first track and said information data recorded in said information data area of two information media as a second track, on said management data area of said information media.

7. A recording device for information media according to claim 1, wherein said control and calculate means controls said recording and reproducing means to record said management data, which manages said information data recorded in an information data area and said information data recorded in said information data area of the current and former information media as a first track and said information data recorded in the said information data area of the current and the latter information media as a second track, on said management data area of said information media.

8. A recording device for information media according to claim 1, wherein said control and calculate means controls said recording and reproducing means to record said management data, which manages said information data recorded in said information data area of the current and former information media as a first track and said information data recorded in an information data area and said information data recorded in said information data area of the current and the latter information media as a second track, on said management data area of said information media.

* * * * *